United States Patent [19]

Barth

[11] Patent Number: 5,199,258

[45] Date of Patent: Apr. 6, 1993

[54] ADJUSTABLE TORQUE/HORSEPOWER EXHAUST CONTROL SYSTEM

[76] Inventor: Randolph S. Barth, 55 Moreau Ave., Freehold, N.J. 07728

[21] Appl. No.: 838,015

[22] Filed: Feb. 20, 1992

[51] Int. Cl.⁵ .............................................. F02B 27/02
[52] U.S. Cl. .......................................... 60/313; 60/323
[58] Field of Search .......................... 60/313, 312, 323

[56] References Cited

U.S. PATENT DOCUMENTS

| | | | |
|---|---|---|---|
| 2,940,249 | 6/1960 | Gospodar | 60/313 |
| 3,470,690 | 10/1969 | Thompson | 60/323 |
| 4,116,172 | 9/1978 | Löhr | 60/313 |

FOREIGN PATENT DOCUMENTS

| | | | |
|---|---|---|---|
| 46011 | 3/1982 | Japan | 60/313 |
| 15710 | 1/1983 | Japan | 60/323 |

Primary Examiner—Douglas Hart
Attorney, Agent, or Firm—Charles I. Brodsky

[57] ABSTRACT

An automotive vehicle header system is described as incorporating a collector having pipes of inside diameter slightly greater than the outside diameter of the pipes exiting from the engine heads which are coupled to it. This permits a removable insertion of one set of pipes into the other, for ease of installation and later servicing of the engine and vehicle, and allows for a sliding of the collector towards, or away from, the engine as desired, to controllably adjust available torque and/or horsepower. In a preferred embodiment of the invention, the lengths for the collector pipes are individually selected so as to equalize the total lengths of all pipes from the engine cylinders to the output end of the collector.

8 Claims, 3 Drawing Sheets

ADJUSTABLE TORQUE/HORSEPOWER EXHAUST CONTROL SYSTEM

FIELD OF THE INVENTION

This invention relates to internal combustion automotive engines and, more particularly, to a header system which allows an adjustable control of the torque and/or horsepower available, while improving engine performance.

BACKGROUND OF THE INVENTION

As is well known and understood, header systems are employed with automotive internal combustion engines to improve operating performance. In such arrangements, individual pipes are connected to the cylinder head exhausts on the engine and couple to the apertures of a collector pipe which in turn is coupled to the vehicle's exhaust system. As is also well known and understood, header systems as are available are individually tailored to a particular make and model of a vehicle, so that a header system designed for one car is not interchangeable with another model, even of the same manufacture. As will be appreciated, different arrangements are employed because of the different spacings and locations of systems in the engine compartment and undercarriage of the vehicle, so that different physical and mechanical specifications have to be satisfied for each individual installation.

Although such header designs have improved system performance, actual installation into the motor vehicle has been quite cumbersome. In many installations, for example, the bendings in the header pipes appear to come unreasonable close to power steering systems for ease of installations — and, in many instances, lead to a need to actually hoist the engine in order to properly place the header into position. Were this not bad enough in and of itself, such installations make it quite difficult to service the engine thereafter — as, for example, the minimal clearances established make it quite difficult to get to the oil filter, or pan, to get to the clutch assembly, and even to service or change spark plugs with a standard socket wrench. Thus, although improved performance results from the use of the header arrangements, the installation and later servicing problems which develop significantly lessen their acceptance by automotive enthusiasts and performance-shop operators.

SUMMARY OF THE INVENTION

Analysis of the above problems associated with header arrangements in use yield the finding, according to the present invention, that the difficulties that existed resulted from the fact that the pipes that were to be connected to the cylinder head exhaust were welded to the input of the collector port. With such manufactures, it thus became clearly impossible to try to move such pipes to any other areas that would not obstruct attempts at later servicing, or attempts to easily install the header over and around existing systems that were already in place. However, and in accordance with the present invention, a new and improved collector pipe is described, in which a plate is internally secured to the inside of the collector substantially perpendicular to its length, having a plurality of equiangularly spaced apertures, equidistant from one another, into which a first plurality of pipes are individually secured. A second plurality of pipes are provided, then, to couple to the cylinder head exhaust ports, and to extend into the first plurality of pipes, whose inner diameters are selected to be slightly greater than the outside diameter of the second plurality of pipes. This permits a sliding insertion of the second plurality of pipes into the first plurality, for ease of coupling and/or removal. In accordance with the invention, and as to be described below, this sliding insertion and removal will be seen to facilitate the installation of the header system, and its later servicing, as the pipes from the cylinder heads can thus be moved about from side to side, so as to ease the installation about obstructing systems and components in the engine compartment, and so as to simplify getting to engine parts needing servicing thereafter, just by displacing the position of the pipes once installed.

As will also be seen, another feature of the invention — incorporated so as to enhance performance by making the engine more breathable and without subsequent "pinging" —, follows from a realization that the lengths of the pipes which couple from the engine heads are not all the same when entering the pipes of the collector system. But, to achieve these desirable results outlined above, the present invention offers the opportunity to individually and predeterminedly select the lengths of the collector pipes to end with a result that the overall lengths of each pair of pipes when coupled together are substantially the same. In other words, with the recognition that the pipe from the first cylinder head is typically longer than the pipe from the second cylinder head in a V-8 engine, the apparatus of the present invention employs a first collector pipe of slightly less length to accept the pipe from the first cylinder head, along with a second collector pipe of somewhat greater length in accepting the pipe from the second cylinder head, and so forth.

As will also be appreciated by those skilled in the art, the collector, once so designed as to permit the slidable movement between its own pipes and those connected to the engine, is such as to yield a structure which can be moved towards, or away from the engine as desired. In such manner, it will be seen that a sliding-forward of the collector towards the engine can result in an adjustably increased torque, while a rearward sliding of the collector away from the engine can produce a higher rpm, and an increased holding of the horsepower for a longer period of time.

BRIEF DESCRIPTION OF THE DRAWING

These and other features of the present invention will be more clearly understood from a consideration of the following description, taken in connection with the accompanying drawing in which.

DETAILED DESCRIPTION OF THE DRAWING

Figure 1:
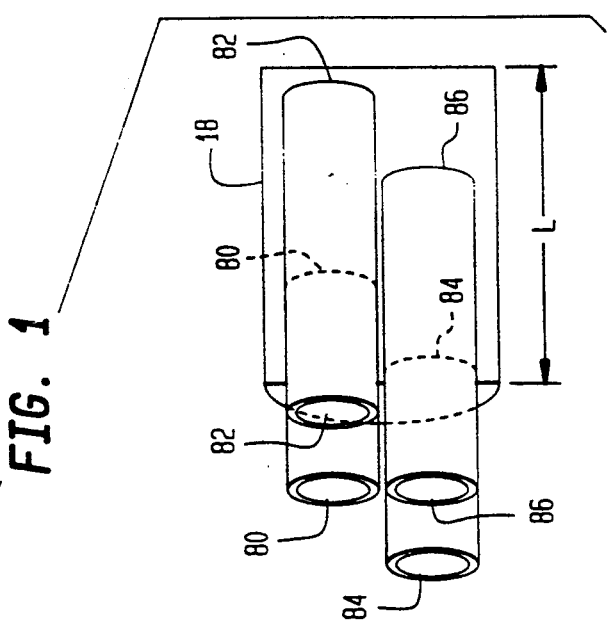
FIG. 1 pictorially illustrates the four header pipes that typically come off one side of a V-8 automotive internal combustion engine by coupling to the exhaust cylinder heads.
Figure 1:
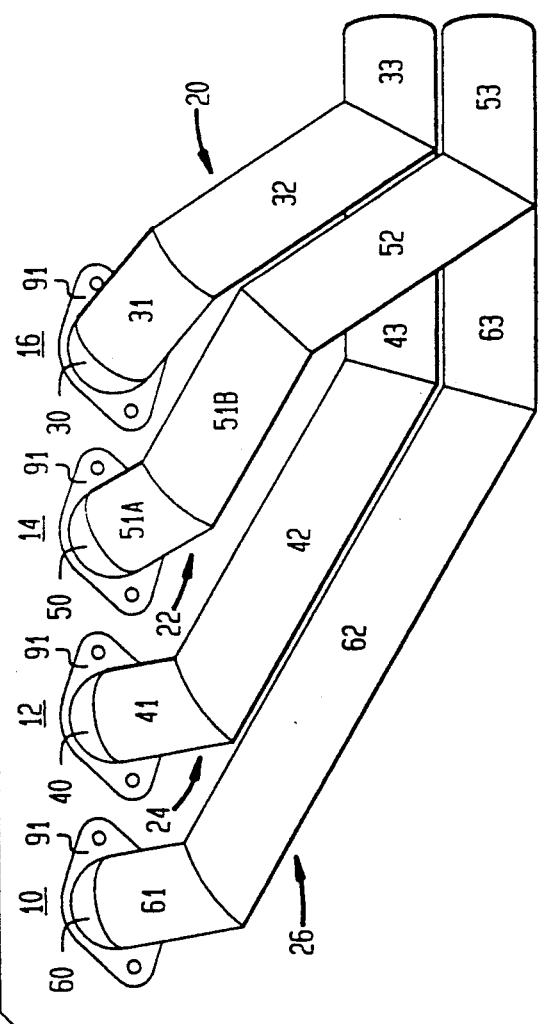

In FIG. 1, the engine cylinder heads on one side of a V-8 engine are represented by the notations 10, 12, 14 and 16. The collector into which the individual header pipes will couple is shown at 18, with the four individual header pipes being shown as 20, 22, 24, 26. As will be appreciated, because of the other components and systems present in the engine compartment of the vehicle, the header pipes — tailored for a particular vehicle manufacture, model and year — are not all the same length, and are not all cut the same way, but are selected of a length, cut, and angle so as to provide the needed bend and clearance in eventually coupling with the collector 18. Thus, and for purposes of illustration, the header pipe 20 is shown as comprising four segments 30, 31, 32, 33 with the segment 33 physically being in front of a portion of the segment 43, which together with the segments 40-42 makes up the header pipe 24. As will be obvious from FIG. 1, the overall length of the segments 30-33 of header pipe 20 is less than the overall length of the segments 40-43 of the header pipe 24.

Also shown in FIG. 1 is a typical third header pipe 22, comprised of four segments 50, 51, 52, and 53, with the segment 53 being physically placed in front of a portion of segment 63 of the header pipe 26, having three other segments at 60, 61, and 62. As will be apparent, the overall length of segments 50-53 of header pipe 22 will be seen to be less than the overall length of the segments 60-63 of the header pipe 26. As will also be appreciated from this illustration, the overall length of the header pipe 26 is greater than the overall length of the header pipe 24 — which, in turn, is greater than the overall length of the header pipe 22, and with the header pipe 20 being of the shortest overall length of the four pipes. In a typical construction, the outside diameters of the header pipes are all selected substantially equal, and of the order of 2-⅛ inches.

Figure 2:
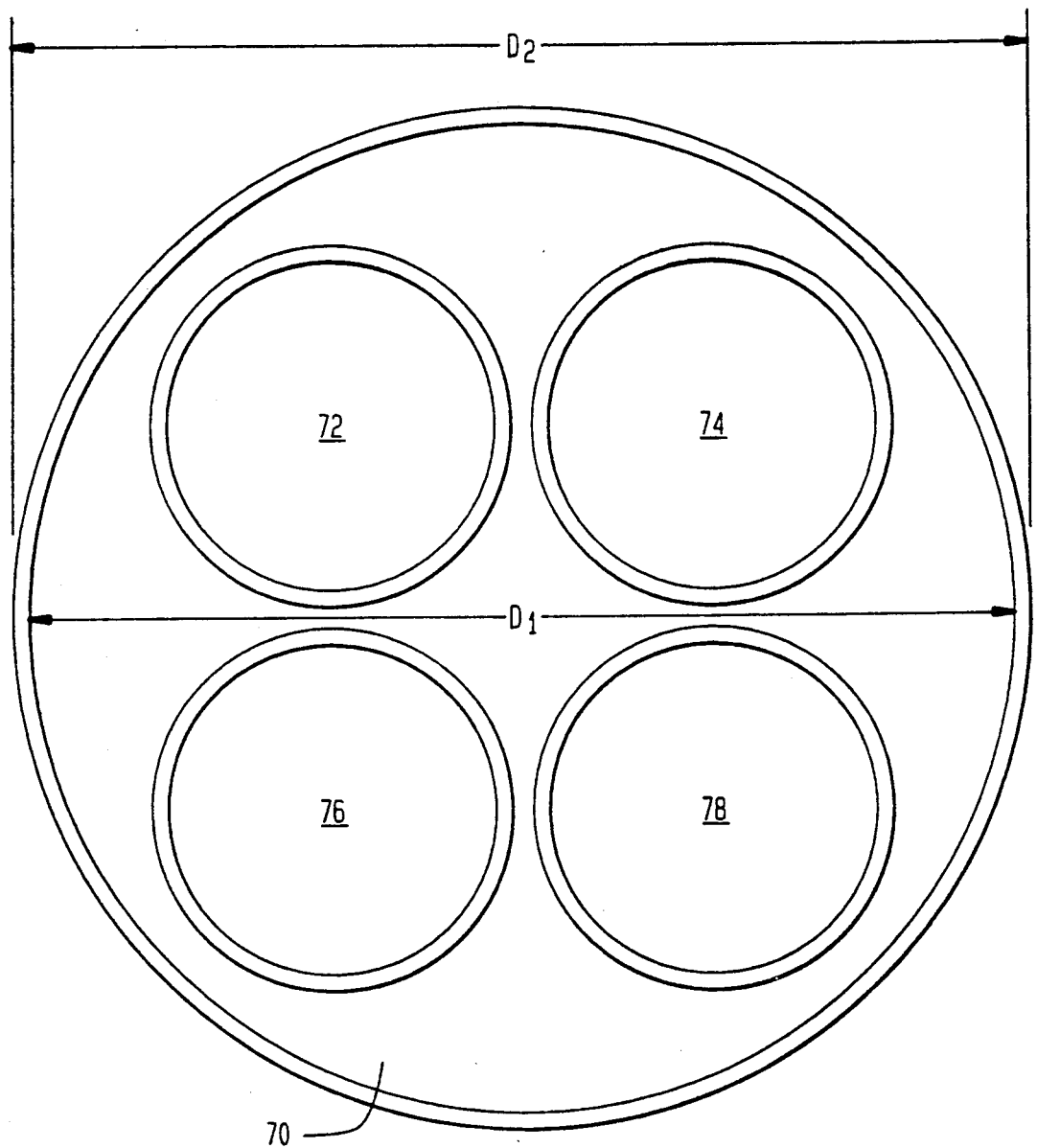
FIG. 2 is a front view of a collector constructed in accordance with the teachings of the present invention.

Referring now to FIG. 2, the front view of the collector 18 there shown illustrates the collector as having an inner diameter $D_1$ and an outer diameter $D_2$, and with its overall length being shown as L in FIG. 1. Also shown in FIG. 2 is a plate 70 internally secured to the collector 18, as by an appropriate welding, along with four apertures or ports 72, 74, 76 and 78. As is also shown — and as will more clearly be understood from the following FIG. 3 —, secured to each of the apertures 72, 74, 76, 78 are four, smaller collector pipes 80, 82, 84, 86, each of which has an inner diameter slightly greater than the outer diameter of the header pipes 20, 22, 24, 26 — which, for header pipes of 2-⅛" outer diameter might be 2-¼" inner diameter for each collector pipe. As will be apparent, and because of this difference in respective diameters, the header pipes 20, 22, 24 and 26 are each able to slide within the collector pipes 80, 82, 84 and 86, in easing their respective insertions and in facilitating their respective removals, one from another. Thus, when imagining the rotation of the collector 18 inwardly of the plane of the paper and to the right of the position shown in FIG. 2, one arrives at the orientation shown in FIG. 3, wherein the header pipe 24 would be oriented to slide within the upper-left aperture 72 (where collector pipe 80 is secured), while the header pipe 20 would be oriented to slide within the upper-right aperture 74 (where collector pipe 82 is secured). In like manner, and with this rotation and orientation, the header pipe 26 would be oriented to slide within the lower-left aperture 76 (where collector pipe 84 is secured), and header pipe 22 would be oriented to slide within the lower-right aperture 78 (where collector pipe 86 is secured). As will be appreciated, because of the clearance of the header pipes with the collector pipes where they are coupled together, it becomes then but a simple matter to slidably remove the header pipe from its respective collector pipe, and to then adjust the header pipe out-of-the-way when it is desired to service the various components, systems and/or assemblies of the vehicle previously obstructed from access by the header pipes in prior art configurations.

Figure 3:
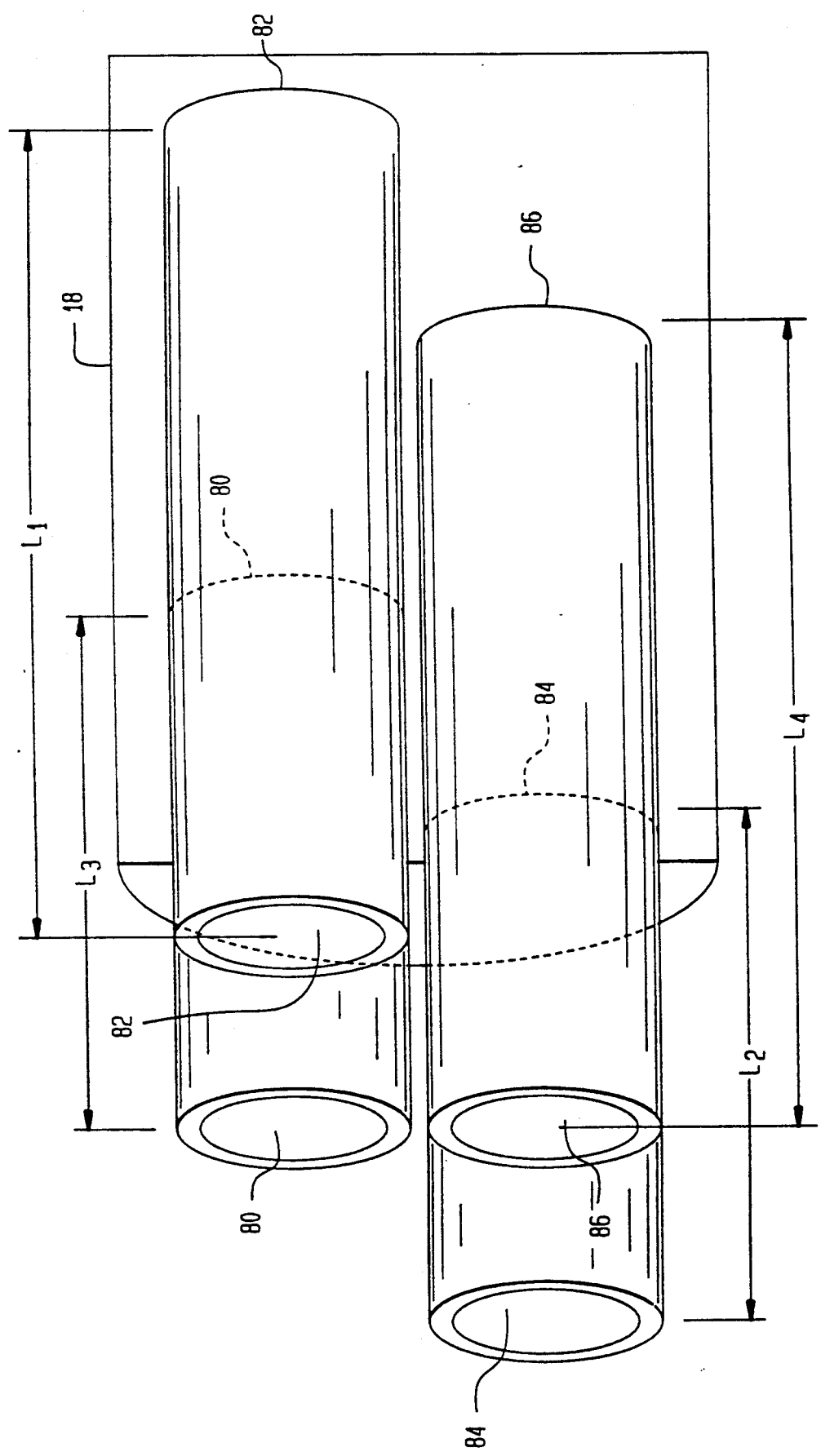
FIG. 3 schematically shows the side view of the collector of FIG. 2 with its pipes of differing length to equalize the overall piping lengths when accepting the header pipes of FIG. 1.

In further accordance with the present invention, and as is schematically illustrated in FIG. 3, the individual collector pipes 80, 82, 84 and 86 are selected of a predetermined length so as to substantially equalize the total length of each header pipe and fitted collector pipe, measured from the engine heads to the output of the collector 18. Thus, for the case where the length of the header pipe 20 is the shortest of the lengths of the header pipes 20, 22, 24 and 26, the collector pipe in connection with which it slides 82, would have the longest length $L_1$ of the four collector pipes 80, 82, 84 and 86. In corresponding manner, where the length of the header pipe 26 is as shown in FIG. 2 to be of the greatest length of the four header pipes employed, the collector pipe 84 in which it slidably is inserted would be of the shortest length $L_2$ of the four collector pipes. In similar fashion, as the header pipe 24 is, as shown in FIG. 2 of a greater length than the header pipe 22, in FIG. 3, correspondingly, the length $L_3$ of the collector pipe 80 is shown to be shorter than length $L_4$ of the collector pipe 86. In establishing these relative lengths, the present invention carries through the concept that best engine performance and least engine "ping" results from having the overall individual lengths of the individual header pipes and their respective collector pipes all be substantially equal.

As is thus far described, it will be understood that the collector 18 can thus slide towards, or away from the engine, as to the left or to the right, correspondingly, in FIG. 3. Testing has shown that by sliding the collector 18 forwardly (as to the left in FIG. 3), more engine torque is available, and the time for which exhaust gases take to travel from the engine to the system's exhaust coupling via the collector output is shortened. Testing has similarly shown that by sliding the collector 18 rearwardly (i.e., to the right in FIG. 3), a longer period of time is taken for exhaust gases to travel to couple to the vehicle's exhaust system, providing a higher rpm, in holding the horsepower longer, but at a slightly-less torque. Analysis has shown that by varying the distance that the collector 18 is moved forwardly or rearwardly, an adjustable control of the torque and of the horsepower can be attained, in order to meet vehicle objectives of the user.

While there has been described what is considered to be a preferred embodiment of the invention, it will be appreciated that modifications can be made by those skilled in the art without departing from the scope of the teachings herein. Thus, while header pipes of 2-⅛ inch outer diameter were selected to cooperate with collector pipes of 2-¼ inch inner diameter, such designations were made for operating with a collector 18 of an overall 6 inch inner diameter. Obviously, if one were to select a different size for the collector 18, the specific diameters of the header pipes and collector pipes would be modified as well, as performance would continue without significant deterioration as long as the difference between the respective inner diameters of the collector pipes and the outer diameters of the header pipes are maintained. And, although described in a context of a V-8 automotive engine, with four cylinders on each side, identical results will be seen to be available for six-cylinder engines as well, wherein only three apertures need be provided for each collector, as contrasted with the four shown in the drawing. In similar fashion, although four segmental sections are usually involved for each of the header pipes 20, 22, 24 and 26 — welded together and of generally unequal lengths, cuts and angles so as to fit and bend around the power steering box of the automotive vehicle, for example —, it will be understood that fewer or more segmental sections may be employed instead, welded to the flange 91, depending upon the contours and/or layout at the header system. Thus, where an additional bend might be required, the segmental section 51 (FIG. 1) might be composed of a pair of joined sections 51A, 51B, as shown. As will be readily appreciated by those skilled in the art, the benefits of the present invention will continue to be had from its teachings of allowing the header pipes to be slidably insertable into and removable from the collector pipes in installing the header system, and in adjusting its respective pipes to facilitate later servicing, and adjustment of torque and/or horsepower requirements. As will also be appreciated, the teachings of the invention will provide corresponding benefits and advantages when incorporated at any location in the automotive exhaust system, and not just as operating with the header pipes as described. For at least such reasons, therefore, resort should be had to the claims appended hereto for a true understanding of the scope of the invention.

I claim:

1. In a header system of an automotive vehicle, the combination comprising:
   a collector pipe of inner diameter $D_1$, outside diameter $D_2$, and length L;
   a plate, internally secured to said pipe substantially perpendicular to the length thereof, and having a plurality of equiangularly spaced apertures equidistant from one another;
   a first plurality of pipes, individual ones of which being securably coupled with respective ones of said plurality of apertures; and
   a second plurality of pipes, individual ones of which being coupled from a head of an internal combustion engine to a respective one of said first plurality of pipes;
   with each of said first plurality of pipes having an inside diameter greater than the outside diameter of each of said second plurality of pipes;
   whereby each of said second plurality of pipes slidably couples with each of said first plurality of pipes and is slidably removable therefrom; and
   with each of said second plurality of pipes being composed of a plurality of pipe segments, individual ones of which being of pre-selected length, and cut at their respective ends at pre-selected angles, for joining together in orientation to traverse component parts of said automotive vehicle engine and exhaust system.

2. The combination of claim 1 wherein each of said first plurality of pipes has an inside diameter approximately ⅛ inch greater than the outside diameter of each of said second plurality of pipes.

3. The combination of claim 1 wherein each of said first plurality of pipes is of a predetermined length, said predetermined length being selected for each of said first plurality of pipes so as to equalize the total lengths of all respective ones of each of said first and second plurality of pipes when slidably coupled together.

4. The combination of claim 1 wherein each of said first plurality of pipes has an inside diameter of approximately 2-¼ inches and wherein each of said second plurality of pipes has an outside diameter of approximately 2-⅛ inches.

5. The combination of claim 1 wherein said collector pipe has an inside diameter of approximately 6 inches.

6. In a header system of an automotive vehicle, the combination comprising:
   a collector pipe of inner diameter $D_1$, outside diameter $D_2$, and length L;
   a plate internally secured to said pipe substantially perpendicular to the length thereof, and having 4 equiangularly spaced apertures A, B, C, D equidistant from one another;
   first, second third and fourth pipes, $P_1$, $P_2$, $P_3$, $P_4$, securably and individually coupled to said apertures A, B, C, D respectively, and of respective lengths $L_1$, $L_2$, $L_3$, $L_4$;
   fifth, sixth, seventh and eighth pipes $P_5$, $P_6$, $P_7$, $P_8$, respectively and individually coupled from a head of an internal combustion engine to said pipes $P_1$, $P_2$, $P_3$, $P_4$, respectively, and of respective lengths $L_5$, $L_6$, $L_7$, $L_8$;
   with each of said pipes $P_5$, $P_6$, $P_7$, $P_8$ being composed of a plurality of pipe segments, individual ones of which being of preselected length and cut at their respective ends at pre-selected angles, for joining together in orientation to traverse component parts of said automotive vehicle engine and exhaust system; and
   with each of said pipes $P_1$, $P_2$, $P_3$, $P_4$ having an inside diameter greater than the outside diameter of each of said pipes $P_5$, $P_6$, $P_7$, $P_8$.

7. The combination of claim 6 wherein each of said pipes $P_1$, $P_2$, $P_3$, $P_4$ has an inner diameter approximately ⅛ inch greater than the outside diameter of each of said pipes $P_5$, $P_6$, $P_7$, $P_8$, whereby individual ones of said pipes $P_5$, $P_6$, $P_7$, $P_8$ slidably couple with individual ones of said pipes $P_1$, $P_2$, $P_3$, $P_4$ and are slidably removable therefrom.

8. The combination of claim 6 whereby when said pipes $P_1$ & $P_5$, and $P_2$ & $P_6$, and $P_3$ & $P_7$, and $P_4$ & $P_8$ are coupled together, the sum of the pipe lengths $L_1$ & $L_5$, the sum of the pipe lengths $L_2$ & $L_6$, the sum of the pipe lengths $L_3$ & $L_7$, and the sum of the pipe lengths $L_4$ & $L_8$ are all substantially equal.

* * * * *